(12) United States Patent
Aotani et al.

(10) Patent No.: US 12,533,843 B2
(45) Date of Patent: Jan. 27, 2026

(54) SHAPING DEVICE AND SHAPING METHOD

(71) Applicant: CANON KABUSHIKI KAISHA, Tokyo (JP)

(72) Inventors: Takaharu Aotani, Tokyo (JP); Yohei Masada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 18/184,050

(22) Filed: Mar. 15, 2023

(65) Prior Publication Data

US 2023/0219293 A1    Jul. 13, 2023

Related U.S. Application Data

(62) Division of application No. 16/720,316, filed on Dec. 19, 2019, now Pat. No. 11,633,787.

(30) Foreign Application Priority Data

Dec. 26, 2018  (JP) .................................. 2018-242518

(51) Int. Cl.

| | | |
|---|---|---|
| *B29C 64/165* | (2017.01) |
| *B22F 10/10* | (2021.01) |
| *B22F 10/14* | (2021.01) |
| *B22F 10/30* | (2021.01) |
| *B22F 12/55* | (2021.01) |
| *B29C 64/20* | (2017.01) |
| *B29C 64/393* | (2017.01) |
| *B29K 505/00* | (2006.01) |
| *B33Y 10/00* | (2015.01) |

(Continued)

(52) U.S. Cl.
CPC ............ *B29C 64/165* (2017.08); *B22F 10/10* (2021.01); *B22F 10/14* (2021.01); *B22F 10/30* (2021.01); *B22F 12/55* (2021.01); *B33Y 10/00* (2014.12); *B29C 64/20* (2017.08); *B29C 64/393* (2017.08); *B29K 2505/00* (2013.01); *B33Y 30/00* (2014.12); *B33Y 50/02* (2014.12)

(58) Field of Classification Search
None
See application file for complete search history.

(56) References Cited

U.S. PATENT DOCUMENTS 9,630,339 B2    4/2017  Hirata
10,183,332 B2   1/2019  Hirata et al.
(Continued)

FOREIGN PATENT DOCUMENTS

| JP | 2004-114685 A | 4/2004 |
| JP | 2015-174361 A | 10/2015 |
| JP | 2015-205485 A | 11/2015 |

*Primary Examiner* — Colin W. Slifka
(74) *Attorney, Agent, or Firm* — Venable LLP

(57) ABSTRACT

A shaping device for producing a layered body by repeatedly performing a step of forming a powder layer and a step of fixing powder in at least a partial region of the powder layer includes a first liquid application unit configured to apply a first liquid including a binder for binding the powder, a second liquid application unit configured to apply a second liquid for suppressing a flow of the first liquid, and a control unit that controls the first liquid application unit and the second liquid application unit so that where the powder in a first region of the formed powder layer is to be fixed, the first liquid is applied to the first region and the second liquid is applied to a second region adjacent to the first region. The second liquid is a liquid having higher permeability to the powder layer than the first liquid.

19 Claims, 5 Drawing Sheets

(51) Int. Cl.
B33Y 30/00 (2015.01)
B33Y 50/02 (2015.01)

(56) References Cited

U.S. PATENT DOCUMENTS

| | | |
|---|---|---|
| 2004/0137228 A1 | 7/2004 | Monsheimer et al. |
| 2006/0244169 A1 | 11/2006 | Monsheimer et al. |
| 2019/0111487 A1 | 4/2019 | Hirata et al. |
| 2020/0086559 A1 | 3/2020 | Sugiyama et al. |

FIG. 2A (STEP1)
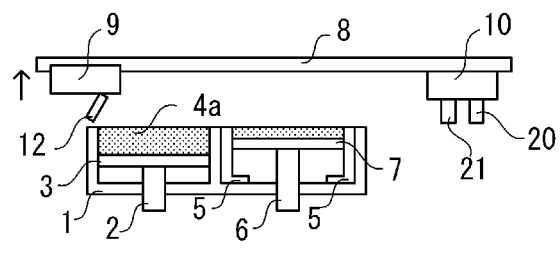
FIG. 2B (STEP2)
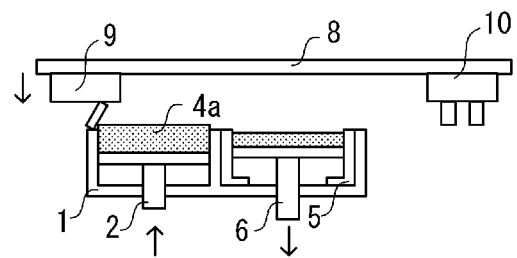
FIG. 2C (STEP3)
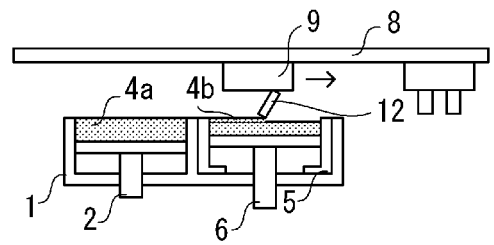
FIG. 2D (STEP4)
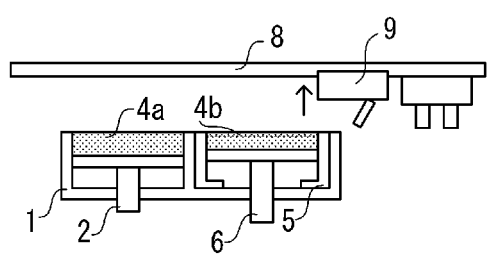
FIG. 2E (STEP5)
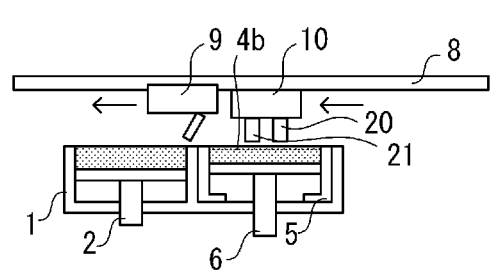
FIG. 2F (STEP6)
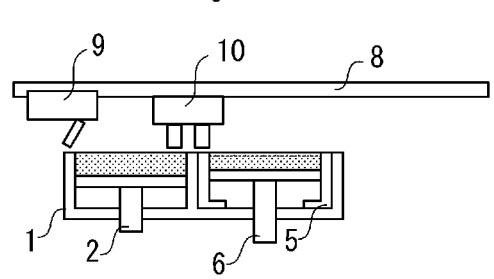

SHAPING DEVICE AND SHAPING METHOD

CROSS-REFERENCE TO RELATED APPLICATIONS

This application is a divisional application of U.S. patent application Ser. No. 16/720,316, filed Dec. 19, 2019, which claims the benefit of Japanese Patent Application No. 2018-242518, filed on Dec. 26, 2018. Both prior applications are hereby incorporated by reference herein in their entirety.

BACKGROUND OF THE INVENTION

Field of the Invention

The present invention relates to a technique for shaping a three-dimensional object using a particulate material.

Description of the Related Art

A technique for forming a three-dimensional object while solidifying powder with a binding liquid is known (see, for example, Japanese Patent Application Publication No. 2015-205485). In this technique, a three-dimensional object is formed by repeating the following operations. First, the powder (composition for three-dimensional shaping) is spread thinly with a uniform thickness to form a powder layer, and the particles of the powder are bonded to each other by applying a binding liquid to a desired portion of the powder layer by an inkjet method. As a result, in the powder layer, only the portion to which the binding liquid has been applied is bonded to form a thin plate-shaped member (hereinafter referred to as "cross-sectional member"). Thereafter, a thin powder layer is further formed on the powder layer, and a binding liquid is applied to a desired portion. As a result, a new cross-sectional member is also formed in a portion of the newly formed powder layer to which the binding liquid has been applied.

At this time, since the binding liquid applied on the powder layer oozes in and reaches the previously formed cross-sectional member, the newly formed cross-sectional member is also bonded to the previously formed cross-sectional member. By repeating such an operation, thin plate-shaped cross-sectional members are layered one layer at a time to form a three-dimensional object.

However, according to the study by the present inventors, in the conventional method, the binding liquid exudes (flows out) outside the desired portion, and the cross-sectional member expands beyond the desired size, so that a three-dimensional object sometimes cannot be accurately shaped.

An object of the present invention is to provide a technique for further improving shaping accuracy in a three-dimensional shaping method in which powders are combined with a binding liquid.

SUMMARY OF THE INVENTION

According to an aspect, it is provided a shaping device for producing a layered body by repeatedly performing a step of forming a powder layer and a step of fixing powder in at least a partial region of the powder layer, the shaping device including:
a first liquid application unit configured to apply a first liquid including a binder for binding the powder;
a second liquid application unit configured to apply a second liquid for suppressing a flow of the first liquid; and
a control unit that controls the first liquid application unit and the second liquid application unit so that where the powder in a first region of the formed powder layer is to be fixed, the first liquid is applied to the first region and the second liquid is applied to a second region adjacent to the first region, wherein
the second liquid is a liquid having higher permeability to the powder layer than the first liquid.

According to another aspect, it is provided a shaping method including:
a powder layer forming step of forming a powder layer; and
a powder fixing step of fixing powder in a first region of the powder layer, wherein
the powder fixing step includes
a step of applying a first liquid containing a binder for binding the powder to the first region; and
a step of applying a second liquid for suppressing a flow of the first liquid to a second region adjacent to the first region, and
the second liquid is a liquid having higher permeability to the powder layer than the first liquid.

Further features of the present invention will become apparent from the following description of exemplary embodiments with reference to the attached drawings.

BRIEF DESCRIPTION OF THE DRAWINGS

FIGS. 2A-2F illustrate a powder layer forming step and a powder fixing step;

DESCRIPTION OF THE EMBODIMENTS

Figure 1:
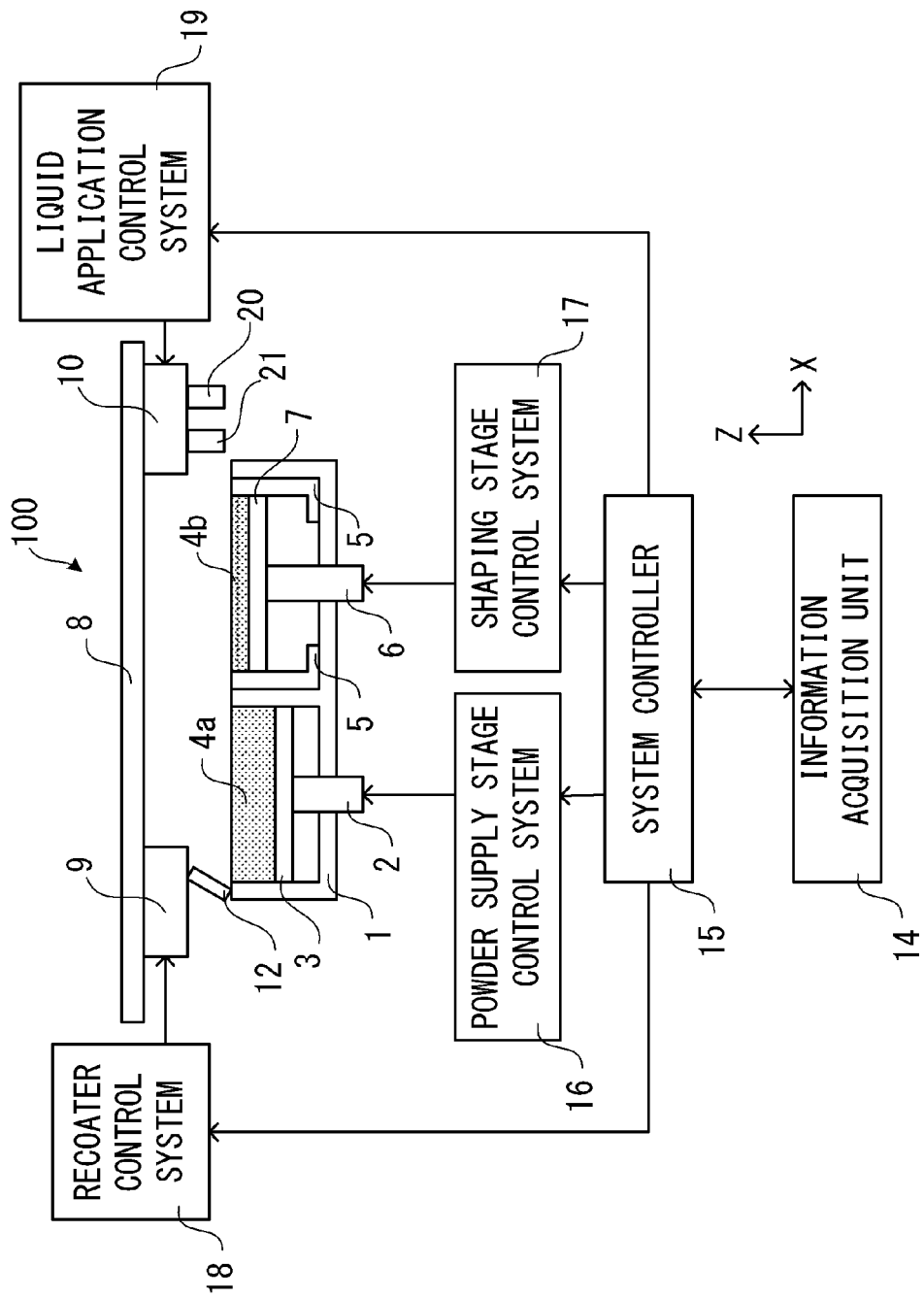
FIG. 1 illustrates an overall configuration of a shaping device according to an embodiment of the present invention.

The present invention relates to a technique for producing a three-dimensional shaped article by using a particulate shaping material. The present invention is preferably applicable to a shaping process in a shaping device called an additive manufacturing (AM) system, a three-dimensional printer, a rapid prototyping system, or the like.

The inventors have developed a three-dimensional shaping device for producing a layered body by repeatedly performing a powder layer forming step of forming a powder layer and a powder fixing step of fixing the powder in at least a part of the region of the powder layer. In the course of the development, it was found that a problem arising when a method of applying the binding liquid to the desired region of a powder layer is used is that the binding liquid may exude outside the desired region, thereby reducing the shaping accuracy.

Where a liquid, not necessarily the binding liquid, is applied to the powder layer, the liquid penetrates through the capillaries between the particles. The spread of the liquid is determined by the interfacial free energy (surface tension) between the liquid and the powder, the density of the liquid, the capillary size, and the like. Therefore, in principle, it should be possible to perform control such that the binding liquid penetrates only into the powder in the desired region by grasping in advance the spread of the binding liquid to the powder layer. However, as a result of experiments carried out by the present inventors, it became clear that it is difficult to stably control the spread of the binding liquid. This is considered to be due to the fact that the particle diameter of the powder is not constant but varies, and the capillary size changes depending on the state of the powder layer.

Accordingly, the present inventors proceeded with studies on a method for controlling the penetration of the binding liquid, and as a result, conceived of means for resolving the problem by applying a liquid (hereinafter referred to as "suppressing liquid") for suppressing the flow of the binding liquid to the powder layer separately from the binding liquid. For example, where the powder in the first region of the powder layer is to be fixed, the binding liquid is applied to the first region, while the suppressing liquid is applied to the second region adjacent to the first region, whereby the exudation of the binding liquid from the first region to the second region is suppressed. At this time, the exudation of the binding liquid from the first region may be completely suppressed by disposing the second region so as to surround the first region. Alternatively, the exudation of the binding liquid may be locally suppressed by arranging the second region to be adjacent to only a part of the boundary of the first region (for example, to prevent the exudation of the binding liquid only in the portion where dimensional accuracy is particularly required). In this way, by applying the suppressing liquid to a portion where the exudation of the binding liquid is wished to be suppressed, the penetration (spreading) of the binding liquid can be appropriately controlled, and the shaping accuracy can be improved. The binding liquid and the suppressing liquid may be applied to the powder layer substantially at the same time or the suppressing liquid may be applied to the powder layer before the binding liquid. This is to prevent the binding liquid from exuding in a timely manner.

A liquid that can penetrate into the capillaries between the particles of the powder and that does not have an effect of binding the particles of the powder or the powder layers can be used as the suppressing liquid. It is preferable to use a liquid having a higher permeability to the powder layer than the binding liquid as the suppressing liquid because the effect of suppressing the exudation of the binding liquid can be enhanced. By appropriately setting the surface tension, density, etc. of the liquids, it is possible to adjust the permeability of each of the binding liquid and the suppressing liquid.

As a result of these studies, the present inventors have arrived at a configuration including a first liquid application unit configured to apply the binding liquid (first liquid) and a second liquid application unit configured to apply the suppressing liquid (second liquid), the two liquid application units being controlled by a control unit. From the standpoint of enabling highly accurate discharge of minute droplets, an inkjet head can be preferably used as the liquid application units. However, the present invention is not limited to the inkjet head, and other types of liquid application units may be used.

In the present description, a three-dimensional model which is to be produced using a shaping device (that is, a three-dimensional object represented by three-dimensional shape data provided to the shaping device) is referred to as a "shaping object". Further, an aggregate of a plurality of particles used as a shaping material is referred to as "powder", and a configuration obtained by leveling the powder to a predetermined thickness is referred to as a "powder layer". Further, a three-dimensional object composed of a large number of powder layers formed on the stage by alternately repeating the powder layer forming step and the powder fixing step is referred to as a "layered body". A region (first region) to be fixed by the binding liquid in the powder layer is referred to as a "shaping region", and a portion other than the shaping region in the powder layer is referred to as a "non-shaping region". Moreover, the region (second region) to which the suppressing liquid is applied in the powder layer is referred to as a "suppression region". The shaping region denotes a region corresponding to a cross section of the shaping object, that is, a portion of the powder layer that should be solidified and taken out as a shaped article. By removing the non-shaping region from the layered body, a "shaped article" corresponding to the shaping object is obtained. At this time, a solidification step of solidifying the shaping region in the layered body by means, such as drying or a heating, may be performed. The strength may be increased by further performing heat processing and sintering with respect to the shaped article obtained after the solidification step. Here, the "shaped article" is also inclusive of the shaping region for one layer obtained by performing the powder layer forming step and the fixing step once.

Resin particles, metal particles, ceramic particles, and the like can be suitably used as the particles constituting the powder (raw material powder) that is the main material of the shaped article, and a material obtained by adding a nonmetallic element such as carbon to a metal, such as a metal alloy, carbon steel, and the like, may be also used. Further, composite particles of a plurality of types of metals, composite particles of a plurality of types of ceramics, and the like may be used. Further, since the flowability of the powder varies depending on humidity, it is desirable to store the powder before shaping in a dry environment, and it is desirable to maintain the dry state as much as possible even during shaping.

Hereinafter, the present invention will be described in detail with reference to preferred embodiments and examples of the present invention. In each drawing, the same reference symbol is provided to the location which illustrates the same member or a corresponding member. In particular, a well-known technique or a publicly known technique in the pertinent technical field can be adopted for configurations and processes not illustrated or described. In addition, redundant description may be omitted.

Configuration of Shaping Device

FIG. 1 illustrates an overall configuration of a shaping device 100 of the present embodiment. Overall, the shaping device 100 of this embodiment has a shaping unit and a control unit.

Shaping Unit

The shaping unit provides a function of performing layered shaping. In the shaping unit, the process of supplying a powder 4a which is a shaping material from a powder supply tank 1 to a shaping tank 5, forming a powder layer 4b in the shaping tank 5, and then fixing a shaping region in the powder layer 4b on the basis of slice data is repeated.

The shaping unit includes the powder supply tank 1, a powder supply stage 2, a powder supply tank bottom plate 3, the shaping tank 5, a shaping stage 6, and a shaping tank bottom plate 7. The shaping unit also includes a guide 8, a recoater unit 9, a liquid application unit 10, a squeegee 12, a binding liquid discharge head 20, and a suppressing liquid discharge head 21.

The powder supply tank 1 is for storing the powder 4a, and inside the powder supply tank 1, the powder 4a is held by the powder supply tank bottom plate 3. The powder supply tank bottom plate 3 is driven in the vertical direction (Z direction in FIG. 1) by the powder supply stage 2. The powder supply tank bottom plate 3 is driven upward by the powder supply stage 2 in order to supply the shaping tank 5 with an amount of powder 4a necessary for forming the powder layer 4b.

The recoater unit 9 is for supplying the powder 4a stored in the powder supply tank 1 to the shaping tank 5 and for leveling the powder 4a supplied to the shaping tank 5. The recoater unit 9 has the squeegee 12 for forming the uniform powder layer 4b while leveling the powder 4a.

In the present embodiment, the recoater unit 9 having the squeegee 12 is illustrated, but other configurations may be used. For example, the recoater unit 9 may have a rotating roller that levels the powder layer while pressing, or may have both the squeegee 12 and the rotating roller.

The shaping tank 5 is for performing layered shaping. Inside the shaping tank 5, the powder 4a supplied from the powder supply tank 1 is held by the shaping tank bottom plate 7. The shaping tank bottom plate 7 is driven in the vertical direction (the Z direction in FIG. 1) by the shaping stage 6 and descends by the thickness of one layer each time shaping for one layer is completed.

The liquid application unit 10 has two types of discharge heads 20, 21. The binding liquid discharge head 20 is the first liquid application unit configured to discharge the binding liquid to the shaping region of the powder layer 4b, and the suppressing liquid discharge head 21 is the second liquid application unit configured to discharge the suppressing liquid to the suppression region of the powder layer 4b. Each discharge head 20, 21 is provided with one or a plurality of nozzles.

The recoater unit 9 and the liquid application unit 10 are supported by the guide 8 and driven in a horizontal direction (X direction in FIG. 1) by an actuator (not illustrated). In FIG. 1, two units 9, 10 are provided at one guide 8, but each unit 9, 10 may be supported by a separate guide (in this case, an independent actuator may be provided for each unit 9, 10).

The shaping tank 5 is configured to be movable away from the powder supply tank 1. After the formation of the shaped article in the shaping tank 5 is completed, the shaped article can be heated together with the shaping tank by separating the shaping tank 5 from the powder supply tank 1 and moving the shaping tank to the heating furnace. Alternatively, a heating unit having a heater may be provided in the shaping device 100, and heating treatment (heating step) may be performed with the heating unit after the powder layer forming step and the powder fixing step for one layer are completed.

Control Unit

The control unit includes a system controller 15, a powder supply stage control system 16, a shaping stage control system 17, a recoater control system 18, and a liquid application control system 19. The control unit may be configured of a computer having a CPU (processor) and a memory. In this case, the functions 15 to 19 are realized by the CPU executing the program loaded in the memory. Alternatively, all or some of the functions of the control unit may be realized with circuits, such as FPGA and ASIC.

The operation of the entire shaping device is controlled by the system controller 15, and information necessary for shaping such as information on the powder 4a and slice data is inputted from an information acquisition unit 14. The system controller 15 issues commands to the powder supply stage control system 16, the shaping stage control system 17, the recoater control system 18, and the liquid application control system 19 in accordance with the device drive sequence, thereby producing a shaped article.

Operation of Shaping Device

FIGS. 2A-2F schematically illustrate the powder layer forming step and the powder fixing step for one layer. In FIGS. 2A-2F, the up-down direction is the layering direction, and the left-right direction is the horizontal direction (the right direction is the X direction).

It is assumed that before starting shaping, the slice data for forming each layer are generated from the three-dimensional shape data of the shaping object by the shaping device 100 or an external device (for example, personal computer or the like). As the three-dimensional shape data, data created by a three-dimensional CAD, a three-dimensional modeler, a three-dimensional scanner, or the like can be used. For example, an STL file or the like can be preferably used. The slice data are obtained by slicing the three-dimensional shape of the shaping object at a predetermined interval (thickness) and include information such as a cross-sectional shape, a layer thickness, and a material arrangement.

Step 1

The powder supply tank 1 stores an amount of the powder 4a necessary for shaping. Where the powder 4a becomes insufficient during the shaping, the powder 4a is appropriately supplied from a powder storage tank (not illustrated) to the powder supply tank 1 through a powder conveyance duct or the like. In FIG. 2A, the recoater unit 9 is positioned at the leftmost home position of the guide 8, and the liquid application unit 10 is positioned at the rightmost home position of the guide 8. The recoater unit 9 can be moved in the vertical direction by a drive mechanism (not illustrated). When the squeegee 12 does not operate, the recoater unit 9 is in a standby state at a position above the operating position.

Step 2

The thickness (layer thickness) of one layer is not particularly limited, but is preferably at least 10 μm and not more than 100 μm. By setting the layer thickness within this range, the productivity of the shaping device 100 can be made sufficiently excellent. For example, where the layer thickness is set to 100 μm, the shaping stage control system 17 lowers the shaping stage 6 by 100 μm, and the powder supply stage control system 16 raises the powder supply stage 2 by 100 μm. In order to form a uniform and flat powder layer 4b on the upper surface of the shaping tank 5, it is effective to supply a large amount of the powder 4a from the powder supply tank 1, and it is desirable that the powder supply stage 2 be actually raised slightly larger than by 100 μm.

Step 3

The recoater control system 18 lowers the recoater unit 9 and then moves the recoater in the X direction. As a result, the powder 4a is conveyed from the powder supply tank 1 to the shaping tank 5, and a uniform and flat powder layer 4b having a thickness of 100 μm is formed on the upper surface of the shaping tank 5.

Step 4

When the recoater unit 9 finishes passing through the shaping tank 5, the recoater control system 18 stops the movement of the recoater unit 9 and raises the recoater unit. Steps 2 to 4 described above constitute the powder layer forming step.

The powder layer forming step illustrated in FIGS. 2A-2D is an example, and the method for forming the powder layer is not limited thereto. For example, methods such as a squeegee method, a screen printing method, a doctor blade method, and a spin coating method can be used. The shaping device 100 may include a plurality of types of powders having different compositions (that is, a plurality of powder supply tanks capable of accommodating different types of powders), and the powder used for shaping may be switchable. For example, a powder to be used for every layer may be selected, and powders of a plurality of types may be mixed in one layer.

Step 5

Figure 3:
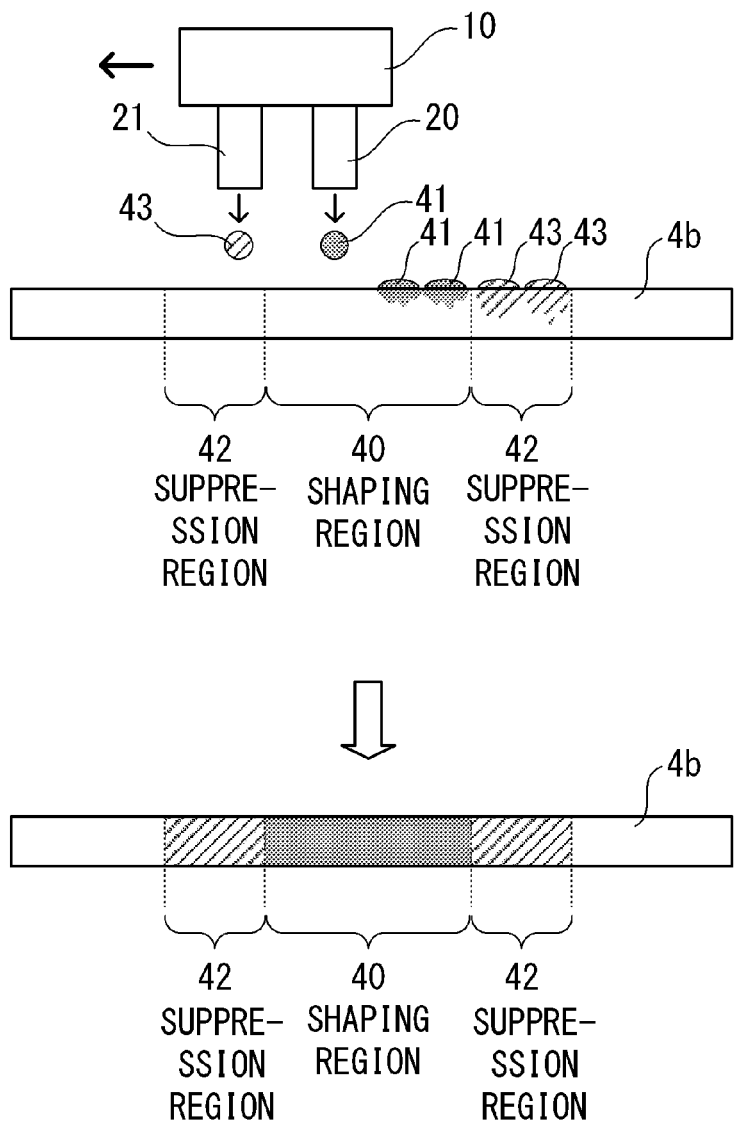
FIG. 3 is a diagram for explaining the application of a binding liquid and a suppressing liquid to a powder layer.

Next, the liquid application control system 19 controls the discharge of the binding liquid discharge head 20 and the suppressing liquid discharge head 21 based on the slice data while moving the liquid application unit 10 at a predetermined speed. As illustrated in FIG. 3, a binding liquid 41 is selectively applied from the binding liquid discharge head 20 only to a region (shaping region) 40 in the powder layer 4*b* where the powder is to be fixed. Further, a suppressing liquid 43 is applied from the suppressing liquid discharge head 21 to a region (suppression region) 42 adjacent to the shaping region 40. As a result, the suppressing liquid 43 penetrates between the particles in the suppression region 42, and the exudation of the binding liquid 41 from the edge of the shaping region 40 is suppressed. Therefore, the spreading of the binding liquid 41 can be suppressed and the shaping accuracy can be improved. In the present embodiment, since the inkjet method is used, even if the shaping region 40 has a complex or fine shape, the binding liquid 41 and the suppressing liquid 43 can be applied only to the necessary regions.

The application of the suppressing liquid 43 may be performed simultaneously with or prior to the application of the binding liquid 41. In the present embodiment, the binding liquid discharge head 20 and the suppressing liquid discharge head 21 are provided in one unit 10, and the application of the suppressing liquid 43 and the application of the binding liquid 41 are performed simultaneously. Thus, the efficiency of the shaping process can be improved (shaping time can be shortened), and highly accurate alignment of the application position of the suppressing liquid 43 and the application position of the binding liquid 41 can be easily realized. However, the present invention is not limited to this configuration, and the binding liquid discharge head 20 and the suppressing liquid discharge head 21 may be independent. Moreover, a step of applying the binding liquid to the shaping region may be performed after performing the step of applying the suppressing liquid to the suppression region for one line or one surface.

Step 6

The recoater unit 9 stops after moving to the home position to form the next powder layer 4*b*. The liquid application unit 10 stops after passing the powder layer 4*b* in the shaping tank 5. The liquid application unit 10 repeats scanning as necessary. Steps 5 to 6 constitute the powder fixing step. A step of binding the powder in the shaping region by heating the powder layer 4*b* under the conditions such that the binder in the binding liquid is sintered may be performed after Step 6.

By repeating Step 1 to Step 6 described above, a layered body composed of a large number of powder layers is formed. Thereafter, the powder in the non-shaping region is removed to obtain a shaped article. As a method for removing the unnecessary powder, any method, including a publicly known method, may be used. For example, cleaning, air spraying, suction, vibration and the like can be mentioned. In the shaping method of the present embodiment, the powder to be removed is not fixed, or even if the powder is fixed, the fixing force is weak as compared to the shaping region, so that the removal is extremely easy. The removed powder can be collected and reused as a shaping material. In addition, a step of heating the shaped article after removing the unnecessary powder may be provided. Thereby, the density of the shaped article can be increased.

Binding Liquid

The binding liquid includes at least a binder. In addition to the binder, the binding liquid may include a water-soluble organic solvent, water, a surfactant that determines surface tension, and the like. Hereinafter, components that can be used in the binding liquid will be described.

Binder

As the binder, metal nanoparticles can be used. For example, nanoparticles such as iron, nickel and silver can be used. Since metal nanoparticles exhibit properties such that the melting point is lowered when the particle size is reduced, treatment at a low temperature that is lower than the melting point of the bulk metal can be expected, and the metal nanoparticles act as the binder at a low temperature. Moreover, a resin may be used as the binder. Examples thereof include thermoplastic resins; thermosetting resins; various photocurable resins such as visible light-curable resins (narrowly defined photocurable resins), ultraviolet-curable resins, and infrared-curable resins; X-ray-curable resins, and the like. A binder combining two or more materials selected from these can also be used. Nanoparticles in the present invention refer to those having an average particle diameter of at least 1 nm and not more than 1 μm, and the size may be appropriately selected according to the average particle diameter of the raw material powder.

From the viewpoint of the mechanical strength of the three-dimensional structure to be obtained, the productivity of the three-dimensional structure, etc., where a metal powder is used as the raw material powder, the binder is preferably metal nanoparticles. The shape of the resin-metal composite shaped article is maintained by the resin component. However, where the amount of the resin component is large, it can cause deformation and breakage during binder removal and voids in the obtained shaped article. Meanwhile, where the amount of the resin component is small, the strength of the resin-metal composite shaped article is weakened, and therefore the shaped article may be broken when removing the particles in the non-shaping region. The amount of the binder in the binding liquid is preferably at least 1% by mass based on the total mass of the binding liquid. Where the raw material powder is a resin powder, the binder is preferably a resin.

Aqueous Medium

The binding liquid may include water and a water-soluble organic solvent. It is preferable to use deionized water (ion exchange water) as the water. Any conventionally used water-soluble organic solvent can be used. Examples thereof include alcohols, glycols, alkylene glycols, polyethylene glycols, nitrogen-containing compounds, and sulfur-containing compounds. These water-soluble organic solvents can be used alone or in combination of two or more as required.

The amount of water in the binding liquid is preferably at least 10% by mass and not more than 95% by mass based on the total mass of the binding liquid. The amount of the water-soluble organic solvent is preferably at least 5% by mass based on the total mass of the binding liquid.

Surfactant

The binding liquid may include a surfactant necessary for adjusting the surface tension. The type of surfactant may be either ionic (cationic, anionic or amphoteric) or nonionic, and may be of a low-molecular system or a high-molecular system. However, where a surfactant reacts and aggregates with the binder, the function expected from the binder may not be fulfilled. Therefore, a surfactant that does not cause the binder to aggregate is preferred. Any conventionally known surfactant can be used as the surfactant, and among these, it is preferable to include a nonionic surfactant. Further, among nonionic surfactants, ethylene oxide adducts such as polyoxyethylene alkyl ethers and acetylene glycol are preferable. For example, ACETYLENOL (manufactured by Kawaken Fine Chemicals Co., Ltd.), SURFYNOL (manufactured by Evonik Industries Co., Ltd.), Dynol 604, 607, 800, 810 (all are manufactured by Evonik Industries Co., Ltd.) and the like can be mentioned. Also, a fluorosurfactant may be used, and since fluorosurfactants have a strong effect of adjusting the surface tension with a small amount since they produce a large effect of reducing the surface tension as compared with other surfactants. The amount of the surfactant is preferably at least 0.01% by mass and not more than 3.0% by mass based on the total mass of the binding liquid.

Other Components

The binding liquid may include, as necessary, a water-soluble organic compound that is solid at normal temperature, such as a polyhydric alcohol such as trimethylolpropane and trimethylolethane, urea and a urea derivative such as ethyleneurea. Furthermore, the binding liquid may include various additives such as a surfactant other than those described above, a pH adjuster, a rust inhibitor, a preservative, an antifungal agent, an antioxidant, a reduction inhibitor, an evaporation accelerator, a chelating agent, etc.

Suppressing Liquid

The suppressing liquid may include a water-soluble organic solvent, water, a surfactant, and other components. Hereinafter, the components which can be used for a suppressing liquid are described.

Aqueous Medium

The suppressing liquid may include water and a water-soluble organic solvent. It is preferable to use deionized water (ion exchange water) as the water. Any conventionally used water-soluble organic solvent can be used. Examples thereof include alcohols, glycols, alkylene glycols, polyethylene glycols, nitrogen-containing compounds, and sulfur-containing compounds. These water-soluble organic solvents can be used alone or in combination of two or more as required.

The amount of water in the suppressing liquid is preferably at least 10% by mass and not more than 95% by mass based on the total mass of the suppressing liquid. The amount of the water-soluble organic solvent is preferably at least 5% by mass based on the total mass of the suppressing liquid.

Surfactant

The suppressing liquid may include a surfactant necessary for adjusting the surface tension. The type of surfactant may be either ionic (cationic, anionic or amphoteric) or nonionic, and may be of a low-molecular system or a high-molecular system. Any conventionally known surfactant can be used as the surfactant, and among these, it is preferable to include a nonionic surfactant. Among nonionic surfactants, ethylene oxide adducts such as polyoxyethylene alkyl ethers and acetylene glycol are preferred. For example, ACETYLENOL (manufactured by Kawaken Fine Chemicals Co., Ltd.), SURFYNOL (manufactured by Evonik Industries Co., Ltd.), Dynol 604, 607, 800, 810 (all are manufactured by Evonik Industries Co., Ltd.) and the like can be mentioned. Also, a fluorosurfactant may be used, and since fluorosurfactants have a strong effect of adjusting the surface tension with a small amount since they produce a large effect of reducing the surface tension as compared with other surfactants. The amount of the surfactant is preferably at least 0.01% by mass and not more than 3.0% by mass based on the total mass of the suppressing liquid.

Other Components

The suppressing liquid may include, as necessary, a water-soluble organic compound that is solid at normal temperature, such as a polyhydric alcohol such as trimethylolpropane and trimethylolethane, urea and a urea derivative such as ethyleneurea. Furthermore, the suppressing liquid may include various additives such as a surfactant other than those described above, a pH adjuster, a rust inhibitor, a preservative, an antifungal agent, an antioxidant, a reduction inhibitor, an evaporation accelerator, a chelating agent, etc. Moreover, as will be described hereinbelow, the suppressing liquid may include a binder having the property of thermally decomposing at a high temperature.

Effect of Suppressing Liquid

Figure 4A:
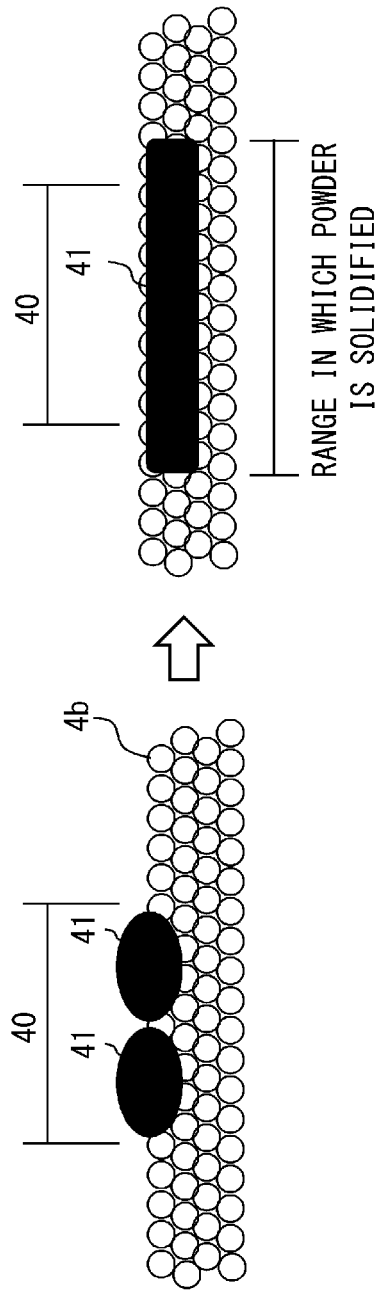
FIGS. 4A and 4B are diagrams for explaining the exudation suppression effect exhibited by the suppressing liquid.
Figure 4B:
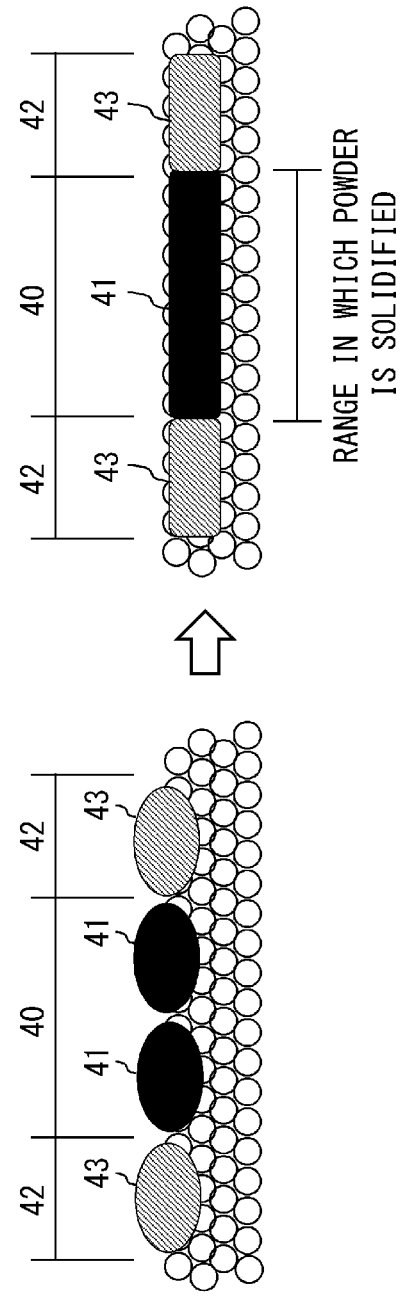

The exudation suppression effect by the suppressing liquid will be described with reference to FIGS. 4A and 4B. FIG. 4A illustrates an example in which only the binding liquid 41 is applied. As illustrated in FIG. 4A, where a droplet of the binding liquid 41 is applied to the shaping region 40 of the powder layer 4b, the binding liquid 41 spreads through the capillaries between the particles. Where the binding liquid 41 exudes to the outside of the shaping region 40, powder in a wider range than the shaping region 40 is fixed, and the accuracy of the shape or size of the shaped article is reduced. FIG. 4B illustrates an example in which the binding liquid 41 and the suppressing liquid 43 are applied. As illustrated in FIG. 4B, where the suppressing liquid 43 is applied to the region 42 adjacent to the shaping region 40, the suppressing liquid 43 penetrates into the capillaries between the particles in the region 42. As a result, the binding liquid 41 is blocked and the binding liquid 41 is prevented from exuding outside the shaping region 40. Therefore, only the powder in the shaping region 40 can be fixed, and a highly accurate shaped article can be produced.

This effect can be obtained even if the composition of the suppressing liquid is only a component necessary for inkjet discharge (water, water-soluble organic solvent, or surfactant). However, as a result of studies by the present inventors, it has been clarified that fine mixing occurs at the interface between the binding liquid and the suppressing liquid, and a small amount of binding liquid (binder) may exude to the suppressing liquid side. Therefore, in order to further enhance the exudation suppression effect, it is preferable to make the surface tension of the suppressing liquid 43 smaller than that of the binding liquid 41. A phenomenon occurs in which the binding liquid 41 is blocked due to the difference in surface tension at the interface between the binding liquid 41 and the suppressing liquid 43, and it is possible to prevent effectively the binding liquid 41 from exuding outside the shaping region 40. The blocking effect is demonstrated even with a small difference in surface tension, but the effect is stronger when the difference is at least 1.0 mN/m. Further, it is more effective to apply the binding liquid 41 after the suppressing liquid 43 is applied. This is presumably because the spread of the binding liquid 41 is suppressed because the interface is firmly formed by the suppressing liquid 43.

Where the heating temperature of the treatment for sintering the binder in the binding liquid 41 is denoted by T, a suppressing liquid 43 including a thermally decomposable binder that decomposes at the temperature T as a component may be used. Where the suppressing liquid 43 includes a binder, when the binding liquid 41 and the suppressing liquid 43 are applied in the powder fixing step, not only the shaping region 40 but also the powder in the suppression region 42 adjacent thereto is fixed. Therefore, the state of the powder layer 4b is stabilized, the ease of handling in the subsequent steps is improved, and as a result, the shaping accuracy can be improved. Moreover, since the binder in the suppression region 42 is decomposed at the time of heat treatment, the binder does not hinder the removal of the non-shaping region. For example, a resin or the like can be used as a thermally decomposable binder.

EXAMPLES

Hereinafter, the exudation suppression effect by the suppressing liquid will be described in greater detail using Examples and Comparative Examples of the present invention. The following Examples are merely exemplary, and are not intended to limit the scope of the present invention. In the description of the following Examples, "part" is based on mass unless otherwise specified.

(1) Binding Liquid

Silver nanoparticle ink NBSIJ-KC01 (surface tension 32.5 mN/m) manufactured by Mitsubishi Paper Mills Limited.

(2) Suppressing Liquid

Preparation of Suppressing Liquid

A liquid composition was prepared with the formulation illustrated in Table 1.

Surfactant

FS3100: Capstone FS-3100 (manufactured by DuPont)

AE100: ACETYLENOL E100, an acetylene glycol surfactant, manufactured by

Kawaken Fine Chemicals Co., Ltd.

Water-Soluble Organic Solvent

Gly: Glycerin

EG: Ethylene glycol

Evaluation

Figure 5:
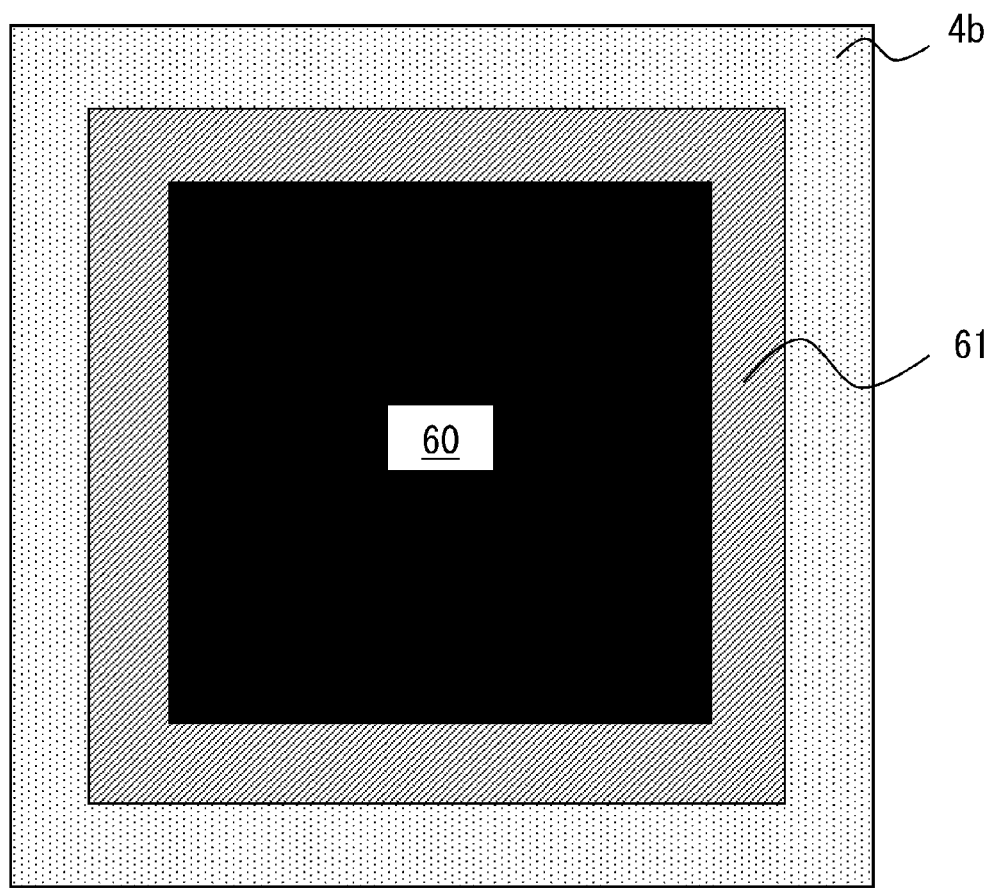
FIG. 5 illustrates a region to which the binding liquid and a suppressing liquid have been applied in an example.

Evaluation was performed under the conditions illustrated in Table 2 by using each liquid composition prepared hereinabove. The binding liquid and the suppressing liquid described in Table 2 were filled in an inkjet recording device equipped with a piezo inkjet head KJ4 (manufactured by Kyocera Corp.; nozzle density 600 dpi). Then, SUS316L (an average particle diameter of 20 µm; manufactured by Sanyo Special Steel Co., Ltd.) was spread in a ceramic container having a hole of 5 cm in length, 5 cm in width, and 5 mm in depth to form a powder layer, and the binding liquid and the suppressing liquid were applied on the powder layer with the inkjet recording device. In Examples 1 to 5 and Comparative Examples 1 to 5, the binding liquid and the suppressing liquid were applied simultaneously. In Example 6 and Comparative Example 6, the suppressing liquid was applied first, and after 30 sec, the binding liquid was applied. The test conditions were a temperature of 23° C., a relative humidity of 55%, an ink discharge frequency of 5 kHz, and about 15 pl per dot of ink discharge volume during recording. In the inkjet recording device, the condition in which one dot of 15 ng droplet is applied to a unit area of 1/600 inch×1/600 inch with a resolution of 600 dpi×600 dpi is defined as the recording duty of 100%. As illustrated in FIG. 5, the binding liquid was applied to a rectangular region 60 in the center of the powder layer, and the suppressing liquid was applied to a region 61 surrounding the rectangular region 60. Then, the exudation of the binding liquid to the outside of the rectangular region 60 was evaluated in five levels, AAA, AA, A, B, and C. AAA to A are preferable levels, and B and C are unacceptable levels.

Evaluation Criteria

AAA: the exudation distance was not more than 0.1 mm

AA: the exudation distance was greater than 0.1 mm and not more than 0.3 mm

A: the exudation distance was greater than 0.3 mm and not more than 0.5 mm.

B: the exudation distance was greater than 0.5 mm and not more than 1.0 mm

C: the exudation distance was greater than 1.0 mm.

Results

From the results illustrated in Table 2, it can be seen that the liquids of compositions 3, 4, 5, 8, and 9 can be combined as a suppressing liquid for the silver nanoparticle ink. In addition, it can be seen that applying the binding liquid after a predetermined time after applying the suppressing liquid provides a higher effect than applying the suppressing liquid and the binding liquid simultaneously.

TABLE 1

| | | COMPOSITION | | | | | | | | |
|---|---|---|---|---|---|---|---|---|---|---|
| | | 1 | 2 | 3 | 4 | 5 | 6 | 7 | 8 | 9 |
| SOLVENT | Gly | | 30 | 30 | 30 | 30 | | | | 30 |
| | EG | | | | | | 30 | 30 | 30 | |
| SURFACTANT | AE100 | | 0.2 | 0.25 | 0.3 | 0.5 | 0.3 | 0.4 | 0.5 | |
| | FS3100 | | | | | | | | | 0.1 |
| WATER | | 100 | 69.8 | 69.75 | 69.7 | 69.5 | 69.7 | 69.6 | 69.5 | 69.9 |
| SURFACE TENSION | | 72.4 | 33.0 | 32.0 | 31.5 | 28.4 | 33.8 | 33.0 | 31.8 | 17.6 |

TABLE 2

| | BINDING LIQUID | SUPPRESSING LIQUID | APPLICATION | EXUDATION SUPPRESSION |
|---|---|---|---|---|
| EXAMPLE 1 | SILVER NANOINK | COMPOSITION 3 | SIMULTANEOUS | A |
| EXAMPLE 2 | SILVER NANOINK | COMPOSITION 4 | SIMULTANEOUS | AA |
| EXAMPLE 3 | SILVER NANOINK | COMPOSITION 5 | SIMULTANEOUS | AA |
| EXAMPLE 4 | SILVER NANOINK | COMPOSITION 8 | SIMULTANEOUS | A |
| EXAMPLE 5 | SILVER NANOINK | COMPOSITION 9 | SIMULTANEOUS | AA |
| EXAMPLE 6 | SILVER NANOINK | COMPOSITION 5 | SUPPRESSING LIQUID -> BINDING LIQUID | AAA |
| COMPARATIVE EXAMPLE 1 | SILVER NANOINK | NONE | SIMULTANEOUS | C |
| COMPARATIVE EXAMPLE 2 | SILVER NANOINK | COMPOSITION 1 | SIMULTANEOUS | B |
| COMPARATIVE EXAMPLE 3 | SILVER NANOINK | COMPOSITION 2 | SIMULTANEOUS | B |
| COMPARATIVE EXAMPLE 4 | SILVER NANOINK | COMPOSITION 6 | SIMULTANEOUS | B |
| COMPARATIVE EXAMPLE 5 | SILVER NANOINK | COMPOSITION 7 | SIMULTANEOUS | B |
| COMPARATIVE EXAMPLE 6 | SILVER NANOINK | COMPOSITION 2 | SUPPRESSING LIQUID -> BINDING LIQUID | B |

According to the present invention, the shaping accuracy can be further improved in the three-dimensional shaping method in which powders are bound with a binding liquid.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A shaping method comprising shaping a layered body by alternately repeating steps of:
    a powder layer forming step of forming a powder layer with powder in a dry state, the powder layer having a first region and a second region adjacent to the first region; and
    a powder fixing step of fixing the powder in the first region of the powder layer,
    wherein the powder fixing step includes:
    a step of applying a first liquid containing a binder for binding the powder to the first region; and
    a step of applying a second liquid containing a surfactant to the second region.

2. The shaping method according to claim 1, wherein the step of applying the first liquid to the first region is performed after the step of applying the second liquid to the second region.

3. The shaping method according to claim 1, wherein the surfactant of the second liquid includes a nonionic surfactant.

4. The shaping method according to claim 1, wherein the surfactant of the second liquid includes a fluorosurfactant.

5. The shaping method according to claim 1, wherein the first liquid includes a surfactant.

6. The shaping method according to claim 1, wherein the second liquid is a liquid having higher permeability to the powder layer than the first liquid.

7. The shaping method according to claim 1, wherein the second liquid has a surface tension smaller than that of the first liquid.

8. The shaping method according to claim 1, wherein the step of applying the first liquid and the step of applying the second liquid are performed by an inkjet method.

9. The shaping method according to claim 1, wherein the second liquid contains a thermally decomposable binder and/or a resin.

10. The shaping method according to claim 1, wherein the powder layer is composed of metal powder.

11. The shaping method according to claim 1, wherein the binder of the first liquid includes a resin.

12. The shaping method according to claim 1, wherein the binder of the first liquid includes a metal particle and/or the first liquid includes metal particles.

13. The shaping method according to claim 1, wherein the powder layer has a third region adjacent to the second region.

14. The shaping method according to claim 13, wherein the powder in the third region maintains the dry state during the shaping of the layered body.

15. The shaping method according to claim 13, wherein the first liquid and the second liquid are not applied to the third region in the powder fixing step.

16. The shaping method according to claim 15, wherein the second region is arranged between the first region and the third region.

17. The shaping method according to claim 13, further comprising removing the powder in the dry state in the third region from the layered body.

18. The shaping method according to claim 1, wherein the powder layer formed in the powder layer forming step does not contain a liquid.

19. The shaping method according to claim 1, wherein in the powder layer forming step, the powder layer has capillaries between particles of the powder layer, and
    wherein, in the powder fixing step, the second liquid penetrates into the capillaries in the second region.

* * * * *